Feb. 28, 1939.                C. ORSINI                 2,149,066
METHOD FOR OBTAINING LUSTER, COLOR, PATTERN, AND COMPLICATED SHAPE EFFECTS
            Filed Dec. 9, 1936              4 Sheets-Sheet 1

INVENTOR
*CAMILLO ORSINI*
BY
*Joseph Hirschma*
ATTORNEY

Feb. 28, 1939.                    C. ORSINI                      2,149,066
        METHOD FOR OBTAINING LUSTER, COLOR, PATTERN, AND COMPLICATED SHAPE EFFECTS
                        Filed Dec. 9, 1936              4 Sheets-Sheet 2

INVENTOR
CAMILLO ORSINI
BY
                    ATTORNEY

Feb. 28, 1939.　　　　　　　　C. ORSINI　　　　　　　2,149,066
METHOD FOR OBTAINING LUSTER, COLOR, PATTERN, AND COMPLICATED SHAPE EFFECTS
Filed Dec. 9, 1936　　　　4 Sheets-Sheet 4

INVENTOR
CAMILLO ORSINI
BY
Joseph Hirschman
ATTORNEY

Patented Feb. 28, 1939

2,149,066

UNITED STATES PATENT OFFICE 2,149,066

METHOD FOR OBTAINING LUSTER, COLOR, PATTERN, AND COMPLICATED SHAPE EFFECTS

Camillo Orsini, Highland Park, N. J., assignor to Nixon Nitration Works, Nixon, N. J., a corporation of New Jersey Application December 9, 1936, Serial No. 115,031

2 Claims. (Cl. 18—61)

This invention relates to plastics, such as pyroxylin plastics, and has for its object an improved process for producing novel and improved patterns, designs and color effects in rods, tubes, sheets and like bodies of plastic material.

Another object is to provide a process for producing shimmering or lustrous effects of great beauty, substantially unbroken by dull or lusterless areas in plastic material of various kinds such as cellulose ester plastics and, preferably, Celluloid.

A further object is to produce such shimmering or lustrous effects by the formation of lustrous areas or bands beneath the surface of the material.

A still further object is to provide a method wherein bands or layers of different colors or the lustrous areas are disposed in planes at various angles to one another throughout the body of material, so that various patterns can be produced depending upon the plane in which said body is sheeted and in the case of the lustrous areas, the shimmering or lustrous effect will be obtained regardless of the plane in which the body is cut or sheeted.

Another object contemplated by the invention is the provision of a method which can be carried out with considerably less labor and which will entail considerably less time in the performance thereof for the production of a given quantity of material.

A further object of the invention is to provide blocks, sheets and the like of plastic material having numerous zones or areas of luster continuing along curved three-dimensional surfaces of any regular or irregular configuration whereby beautiful lustrous effects of different degrees of intensity and shading are obtained in all angular positions, relatively to the observer, of the block, sheet, or articles fashioned therefrom.

More specifically, the process of the present invention comprises cutting a cylinder or block of plastic material of one color into any desired number of segments and substituting for certain of said segments similarly formed segments of differently colored material. The composite, multi-colored cylinder or block thus produced is then charged into an extrusion machine from which it emerges in the form of tube, rod, bar or the like, which may be extruded straight or in a twisted condition depending upon the effect desired in the pattern in the final product of the process. The elongated body so obtained, whether a tube or bar, straight or twisted, is then cut into convenient lengths or sections which may be placed side by side in one or more layers in a suitable form or chase and pressed into a solid block. This block is then sheeted either parallel or at an angle to the axes of the rods, thus producing sheets having multi-colored patterns embodying pleasing twists and curves when the sheet is cut parallel to the axes of the rods and beautifully formed spiral effects when sheeted perpendicularly to said axes. The various effects produced in the pattern will also vary dependent upon the disposition of the layers of colored material in the extruded bodies, this extrusion step being carried out to effect various arrangements of the several layers with respect to each other as above indicated. If desired, additional decorative effects in the nature of intricate and spider-like spirals and veinings can be obtained by inserting thin bodies or sheets of dark colored plastic material between adjacent segments of the multi-colored cylinder. When the extruded twisted bodies or rods formed from such a cylinder are compressed into a block and sheeted perpendicularly to their axes, unitary designs are produced in the sheets, said designs having component elements consisting of spiral veinings with the veins radiating, so to speak, from a common point of each so-called element if the dark-colored insert sheets extended to the center of the original multi-colored cylindrical body of material. Where it is desired to obtain the lustrous areas or shimmering effect in the final product, luster-producing particles, such as fish scale pigment, bronze powder or the like are incorporated in the original body of plastic material and the present process is adapted to orientate these particles in such fashion as to arrange the light-reflecting surfaces of groups of said particles in such fashion that numerous lustrous bands or areas are formed interiorly, as well as on the surface of the extruded tube or rod, with the bands or areas promiscuously disposed throughout the mass.

With these and other objects in view, the invention consists in certain details of construction and combinations and arrangements of parts, all as will hereinafter be more fully described, and the novel features thereof particularly pointed out in the appended claims.

In the accompanying drawings illustrating one form of apparatus for carrying out the method of the present invention—

Fig. 2 is a detail view, in longitudinal section on a larger scale, taken on the same vertical plane as Fig. 1, illustrating the extrusion head and nozzle;

Fig. 7 is a detail view in longitudinal elevation upon a still larger scale of the mandrel shown in Fig. 2;

The material to be processed in accordance with the present method is preferably prepared initially in the form of a dough in mixing machines by mixing nitrated cotton with camphor and a suitable solvent for nitro-cellulose. Where a lustrous effect is desired in the finished product, a suitable pigment or luster-producing particles may be included in the mixture prepared in the mixing machine. Likewise, in the production of an opaque product, the opaque coloring matter is preferably worked into the mass in the mixing rolls through which the material is passed after it has been removed from the mixing machine and filtered. In other words, the material from the mixing machine is passed through a filter which forces the dough through a screen and removes all dirt and extraneous matter therefrom. In some cases, the filtered material is then passed to the mixing rolls in which any excess solvent is removed while the material is thoroughly kneaded.

Where the mixing roll step is omitted, the material which comes from the filter in a jelly-like mass is formed into a cylindrical body or cartridge in a suitable mold and when the mixing rolls are used, the material, in a rather thick sheet, may be rolled up into a cartridge. In making so-called horns and mottles, the charge for the extrusion machine 10, wherein the material is subjected to the method of treatment of the present invention, is made up by taking sections or segments of two or more previously prepared cartridges of differently colored material and assembling the several sections to form a multi-colored composite cartridge, the contrasting colors being such as to produce the desired pattern in the finished product. This composite cartridge is then inserted in the cylinder 13 of the extrusion machine from which it emerges or is extruded in the form of a tube or rod in which the contrasting colors are irregularly disposed but still in accordance with the general pattern, that the mottle effect will be obtained.

In detail, this method of manipulating the material to produce these results is as follows: The ram or plunger 14, in fluid-pressure cylinder 12 mounted in frame 11, forces a cartridge from cylinder 13 through one or more passages in which the stream of material is subdivided into a plurality of ribbon-like increments. These subdivisions are then reunited in a portion of the passage so constructed that the ribbons in the reunited mass are curled or curved instead of extending in straight lines. The reunited mass is then, again, subdivided into a number of ribbons and extruded from the apparatus in either a twisted or untwisted rod or tube-like mass.

The machine illustrated in the present instance is adapted for use with three extrusion nozzles or heads 15 each communicating with cylinder 13. Each head, in its general structure, is of the known type, in that it includes a member 16 of annular shape formed separately from the cylinder 13, but hinged thereto at 17 upon a horizontal axis whereby the head may swing clear of the mouth of the cylinder so the latter can be charged with the cartridge from in front. The joint 18 is preferably sealed with suitable packing and a clamp 19 may be provided to hold the head firmly against cylinder 13. The head and clamp may be readily actuated by means of hand wheels 20, 21. Heating and/or cooling jackets 22, 23, of usual form may be, and preferably are, provided where necessary as will be understood by those skilled in the art.

Secured to member 16 is a sleeve 25 to which is secured tubular member 24. Sleeve 25 may be welded or otherwise secured to member 16 and member 24 may be attached by a screw-threaded connection to the sleeve to permit its ready detachment. The interior of these parts 16, 25 and 24 forms a continuous conduit for the plastic material forced from cylinder 13, the internal diameter thereof gradually decreasing until approximately the middle of member 24, at which point a throat 26 is formed. The surface of this conduit may be lined with a non-corrodible material 27 and member 24 may be formed with recesses 28 for a tool to facilitate mounting and demounting thereof. The discharge end of member 24, or of said conduit, is flared outwardly and receives a tapered divider block 29 secured in place by a plate 42 threaded to member 24. The divider block distributes the plastic mass into as many streams as the machine has nozzles, three in the present instance. Said block is, accordingly, formed with three diverging ducts 31 each leading to one of said nozzles but the total cross-sectional area of the several ducts should not be substantially greater, and is preferably less than the cross-sectional area of throat 26 in member 24. Preferably, the several ducts diverge toward their discharge ends 33, at which point they are substantially horizontally disposed. A heating medium circulated through jackets 34, 35, maintains the material in a plastic state.

The present form of nozzle, indicated generally at 36, is shown in detail in Fig. 2, but it will be understood that different forms of nozzles may be used in connection with the several ducts 31. The expression "nozzle" is used herein to designate the entire unit or instrumentality used for treating the material after the latter leaves the duct 31 and, essentially, it is the nozzle within which the several steps of the present method are carried out for successively subdividing; uniting; and again subdividing the material, as above outlined. The nozzle includes, at its base, a member 37, conveniently termed a spider, breaker or initial ribboner, in that it subdivides the stream of material into a plurality of ribbon-like increments. This spider preferably comprises two series of arcuate channels 38, 39, concentric with respect to the longitudinal axis of the spider and staggered with respect to each other. The walls of the channels are preferably very smooth and of such axial length that the plastic is formed into a plurality of straight ribbons therein. Where luster-producing particles have been included in the mixture, the effect of the walls of said channels is to orientate said particles and cause the latter to assume positions in parallelism with each other with their brilient lustrous surfaces disposed outwardly. That is, the particles are alined in flat relationship along the surfaces of the individual ribbons.

Spider 37 may be supported in position by a coupling member 40 screwed into a socket 41 in a plate 42 and the latter is supported from the reduced threaded end of member 24. Plate 42 contains the heating jacket 35 previously referred to, the annular space being closed by a cover 43. Coupling member 40 is preferably provided with a shoulder which bears against spider ring 37 and holds it snugly against its seat within member 42.

As the subdivisions or ribbons emerge from the breaker or spider, they pass into a chamber or channel 50 within an elongated tubular bushing 44, formed with an axial bore 45 for reception of a mandrel 46. This chamber 50 which extends around the mandrel is tapered toward the bore of said mandrel and the inner end of the mandrel is preferably enlarged as at 49, said enlargement also being tapered toward the bore 45. In other words, chamber 50 is restricted in the direction in which the material flows and, as a consequence, the ribbons or subdivisions are caused to curl or ball up, so to speak, before they enter the bore proper of the mandrel. As a result, the surfaces of the several ribbons do not remain straight and parallel throughout their length but are curved or wavy and disposed promiscuously through the mass formed by thus reuniting the ribbons at this point. Member 40, by means of a shoulder thereon, may be utilized to hold bushing 44 in proper assembled relation with the spider and, for reasons which will presently appear, mandrel 46 is preferably supported in cantilever fashion from the spider. For this purpose the hub of the spider may be provided with a bore through which extends a threaded post 47 on the mandrel, and said post is engaged by a nut 48 to clamp the mandrel to the spider. Said nut may be of conical shape, so as to divert the stream of material from duct 33 outwardly towards the channels 38, 39.

Figures 3, 5, 6:
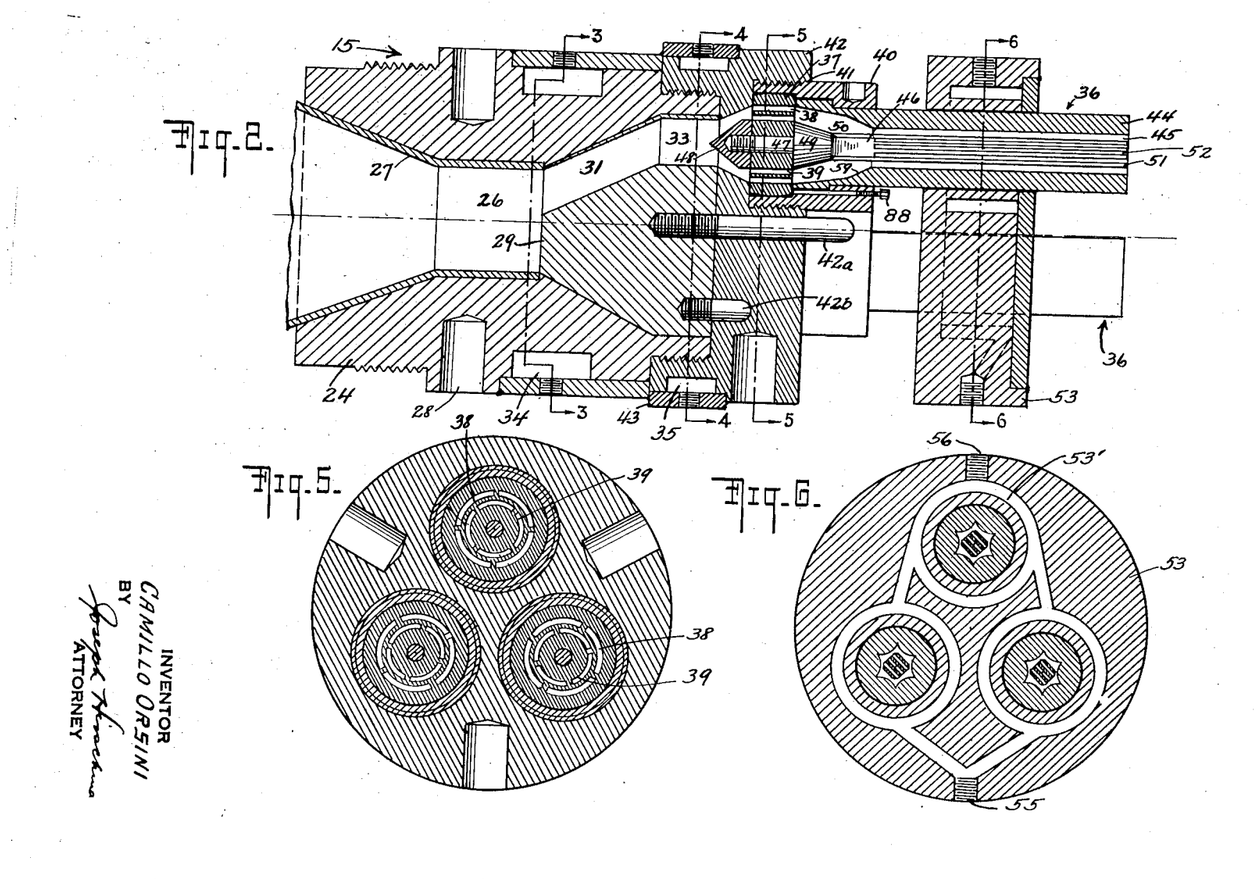
Figure 8:
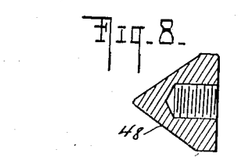
Fig. 8 is a detail sectional view of a cooperating part of said mandrel.
Figures 9, 10:
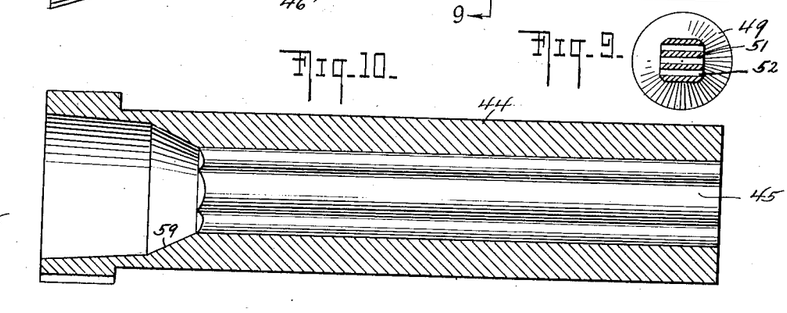
Fig. 9 is a transverse section on the line 9—9 of Fig. 7.
Fig. 10 is a longitudinal sectional view of the extrusion nozzle.

In accordance with the present process, the material, after the several ribbons have been reunited in compartment 50, is again subdivided into a large number of ribbon-like instruments. For this purpose, the mandrel 46 is so formed that, as the plastic material flows through the bushing 44, it is divided into a large number of sections or ribbons which pass, under pressure, through the bushing and are extruded therefrom in the form of an elongated rod or tube. Where the luster-producing particles have been incorporated in the plastic, this subdividing of the material within the bushing results in the formation of a multiplicity of internal lustrous planes which remain as definite zones of luster and brilliance even though the material is subsequently welded into a compact mass. In other words, by dividing the mass of plastic into a large number of sections or ribbons and passing these subdivisions under pressure over smooth, preferably metallic, surfaces, the innumerable particles of bronze powder or like material suspended in the plastic are alined or orientated in parallelism with their brilliant, lustrous surfaces facing outwardly, the particles being alined in flat relationship along the surfaces of the ribbons. When these ribbons are forced together again, and extruded from the bushing in the form of a solid rod or tube, these lustrous areas are not destroyed and, when the material is cut along or near such areas, the luster appears even through the mass of overlying, more or less transparent, plastic, with its original brightness or with various shades and nuances, dependent upon the angle of the cut and upon the angle or curvature of the lustrous surfaces, giving a shimmering, three-dimensional effect, comparable to that of fabrics having so-called "changeable" colors. For this purpose, that portion of mandrel 46 within the bore of bushing 44 is cut or slotted to provide a plurality of forks or tongues 51, in the present instance, four in number, as illustrated in Figs. 2, 7 and 9. The plastic material which, after having passed through the spider 37, has become more or less welded together in the space 50, passes into the narrow, smooth-wall passageways 52 between the tongues 51, and also between the mandrel and the walls of the bore 45. To maintain a high pressure within the bore of the bushing, the cross-section thereof is reduced in area, as by making it star-shaped in cross-section with six apices, between which the walls are convexed. (See Figs. 6, 10 and 11.) Thus, the available flow area between the external surface of the mandrel and the inner surface of the bushing is considerably less than the cross-section of passage 50 and the material is compelled to flow into the narrow passageways 52 in the mandrel. The plastic is thus cut within the nozzle into a large number of strips or ribbons, the opposite faces of each of which glide under pressure against smooth metallic surfaces whereby the luster-producing particles at such surfaces are alined in flat parallel relationship, thereby producing surfaces of high luster. The several ribbons of material issuing from the nozzle may be drawn off in straight condition, the lustrous surfaces formed within the bushing thus being maintained flat and more or less parallel to each other, although it will be understood that those lustrous areas which were previously produced in passing the material through the spider will be disposed at various angles, due to the curling or balling up action within compartment 50. Each nozzle may be heated by a heating medium flowing through passages 53a by way of supply and exhaust openings 55, 56.

Figures 1, 3, 4, 17:
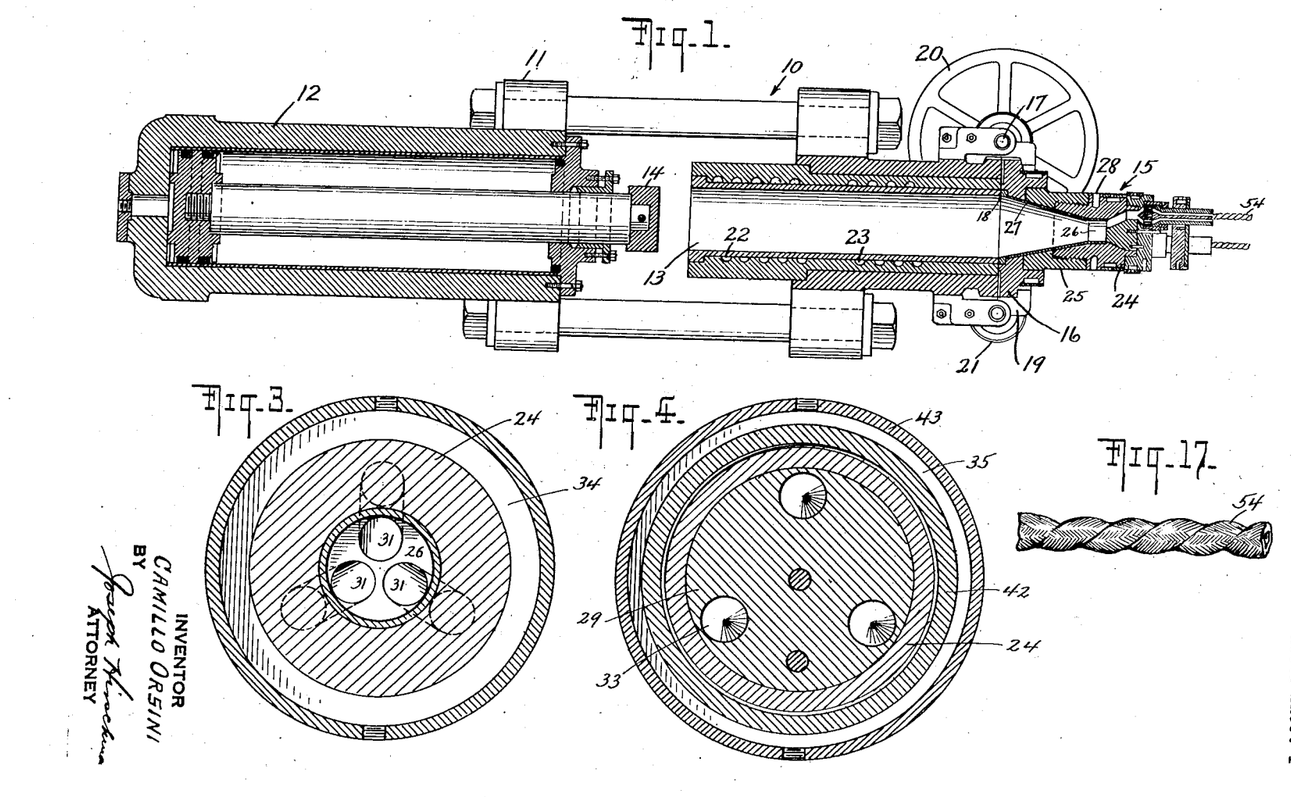
Figure 1 is a side elevation, partly in section, of an extrusion press, the extrusion head of the machine being shown in longitudinal vertical section.
Figs. 3, 4, 5 and 6 are transverse sectional views on the lines 3—3; 4—4; 5—5 and 6—6, respectively, of Fig. 2.
Fig. 17 is a side elevational view, on an enlarged scale, of a portion of the product of the present method as it is extruded from the nozzle of the machine.
Figure 11:
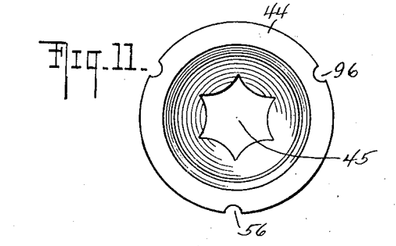
Fig. 11 is an end elevation of the nozzle illustrated in Fig. 10, looking from left to right.
Figure 12:
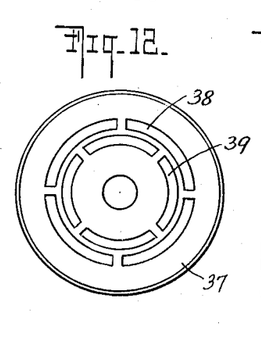
Fig. 12 is an end elevation of a cutter member or "breaker" which also serves as a support for the mandrel.
Figure 13:
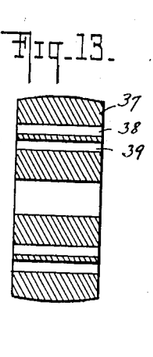
Fig. 13 is a transverse vertical section of said cutter member or breaker.
Figure 14:
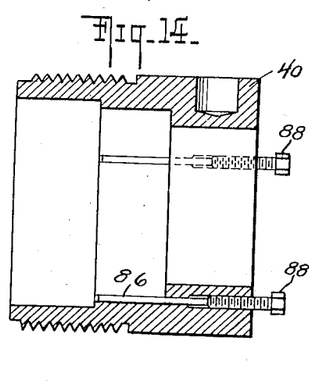
Fig. 14 is a view similar to Fig. 13 illustrating a socket member which serves as a support for the cutter or breaker.
Figures 15, 16:
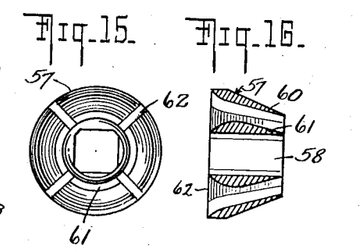
Fig. 15 is a detail view of a spider structure which may be used as a second support for the mandrel under certain conditions.
Fig. 16 is a sectional view on the line 16—16 of Fig. 15.

While it may be desirable, in certain instances, to maintain the parallel relationship of the ribbons formed within the bushing, it is preferred to twist the extruded material as it emerges from the nozzle so that a twisted rod or tube is obtained in which the lustrous surfaces produced within the bushing may run parallel to each but, instead of being flat, are disposed helically, as illustrated in Fig. 17, wherein there is shown a twisted rod 54 of plastic composed of a plurality of the ribbons which have been welded together by twisting. While the twisting above referred to may be done manually, the same results can be accomplished by a simple adjustment of the nozzles so as to impart a twist to the ribbons automatically as they emerge therefrom. For this reason, the mandrel 46 is adapted to be positioned eccentrically with respect to the axis of bushing 44 under which conditions the pressure and flow conditions within the nozzles are unbalanced to such an extent that the material is extruded with a definite twist. To effect such adjustment of the mandrel, screws 88, in this instance, three in number, as shown in Fig. 14, are threaded in the tapped holes in coupling member 40 and are provided with extensions 86 which bear against the outer portion of spider 37. By suitably adjusting the screws, the axis of the spider can be tilted within certain limits with respect to the axis of bushing 44 and, as the mandrel is rigidly mounted upon the spider, it will be displaced together with the spider. To facilitate this adjustment of the spider, the outer surface thereof can be rounded off to a small degree, as shown in Fig. 13. The inner end of the bushing 44 may be provided with notches 96 where necessary, as shown in Fig. 11, to accommodate the extensions 86 of the screws. Where, however, it is desired to keep the mandrel permanently in coaxial relation with bushing 44, it may be additionally supported by a second spider 57 (Figs. 15 and 16), which is provided with a central opening 58 through which the mandrel passes. This second spider 57 has a tapered outer surface adapted to be positioned against the tapered portion 59 of bore 45. Spider 57 is composed of an outer ring 60 and an inner ring 61 held together by spokes or partitions 62. As will be apparent, the plastic material flowing through the annular passageway 50 will be cut into four sections by the spokes 62 of spider 57, the material then becoming at least partially welded together before it enters the slotted passageways 52 of the mandrel. Preferably, the passageways through spider 57 are of gradually diminishing cross-section.

As a résumé, it might be stated that in carrying out the present improved process, as applied to the manufacture of sheets of plastic material having lustrous areas within the interior thereof capable of being seen through the more or less transparent material with such lustrous bands or areas running at various angles to the surface of the sheet and thereby producing lustrous and shimmering effects of different tones or intensities throughout the greater portion of the sheet, a mass of plastic material having suspended therein luster-producing particles, such as bronze powder, is shaped into a block of suitable size in a mold and then, upon the release of the extrusion head by loosening the clamp 19, it is inserted into the cylinder 13 from the front thereof. After clamping the extrusion head on the cylinder 13, pressure fluid is introduced into cylinder 12 and, thereupon, the plastic in the cylinder 13 is placed under pressure and forced into the extruding nozzle. By virtue of the gradually decreasing internal cross-section of the passage into which the material is forced, it is maintained continuously under high pressure. As it passes through the divider mechanism or spider 37, it is cut into two circular series of ribbons which glide over the more or less smooth metallic surfaces defining the slots 38, 39, and the bronze powder particles are, to a certain extent, alined at those surfaces to produce areas of luster. These ribbons are then welded together within the space 50, at which time, due to the curling or balling up action within said space or chamber, the areas of luster become disposed at various angles through the mass. The mass thus welded together then passes into the region of bushing 44 within which is housed the longitudinally slotted portion of mandrel 46. As the total free flow cross-sectional area within the bushing is not substantially greater and is preferably less than the flow area within chamber 50, the plastic material is forced into the slots 52 formed by the several tongs of the mandrel. Within these slots, material is forced under pressure for a considerable distance over relatively long, smooth, hard surfaces which orientate the luster-producing particles and impart to the several subdivisions highly lustrous surfaces along planes which, at least for the most part, are different from the planes of cleavage at the divider 37. The material passing through the bushing thus has a large number of luster surfaces imparted thereto by the spider 37 and the mandrel 46 in different degrees of intensity. As the material emerges from the mouth of the nozzle, it may be permitted to collapse into a more or less flat rod, or it may be twisted manually but, as previously explained, it is preferred that the mandrel 46 be positioned eccentrically with respect to the bushing to automatically effect the twisting of the extruded material. The degree or pitch of twist is of course regulable by controlling the degree of eccentricity of the mandrel. In this way, a twisted rod or tube, as shown at 54 in Fig. 17, is obtained, the outer surfaces of such body being lustrous and said body also containing numerous internal bands or areas of luster which can be easily seen by cutting the rod longitudinally. Some of said bands, for instance those produced by the slotted portion of mandrel 46, being substantially continuous and a great number of the areas of luster, particularly those formed at the spider 37, will be disposed at various angles to the surface, thus producing pleasing shades and tones of luster which are visible not only at the surface, but through the transparent, or semi-transparent, plastic material.

For producing highly lustrous sheets suitable for the manufacture of fountain pen barrels, knife handles and other ornamental ware, the rod 54 is cut into sections of suitable length, say two to four inches and the pieces are then arranged within a suitable press-box in parallel superimposed relationship. This mass of rods is then pressed into a solid block in a manner well known in the art. Upon sheeting of such block along planes parallel to the axes of the rods, sheets are obtained which show lustrous areas of different intensities for the greater part of the surface of the sheet; in fact, for as much as 70 to 80% or more of the total area. This sheet will to some extent show spiral convolutions corresponding to the convolutions of the original rods. However, by arranging the rods in different ways, different composite effects can be obtained. Thus, by cutting a sheet at an angle to the axes of the rods, for example, at right angles, a lustrous "rose-bud" pattern will be obtained consisting of streaks of luster issuing more or less spirally from a central point and surrounded by more or less non-lustrous areas.

Figures 18, 19:
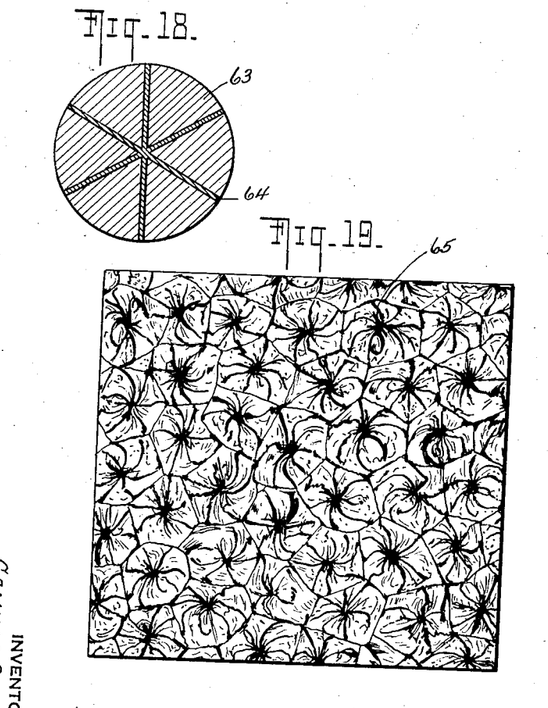
Fig. 18 is a transverse sectional view of a cylindrical body of plastic formed up to produce a veined, multi-colored product when processed by the present machine in accordance with this invention.
Fig. 19 illustrates a portion of a sheet of the product produced by the present method, illustrating the pattern obtained from the veined cylinder of Fig. 18.
Figure 20:
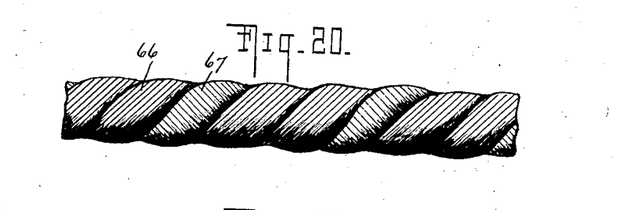
Fig. 20 illustrates a two-colored rod-like body having internal bands or zones of luster produced in accordance with the present invention.
Figure 21:
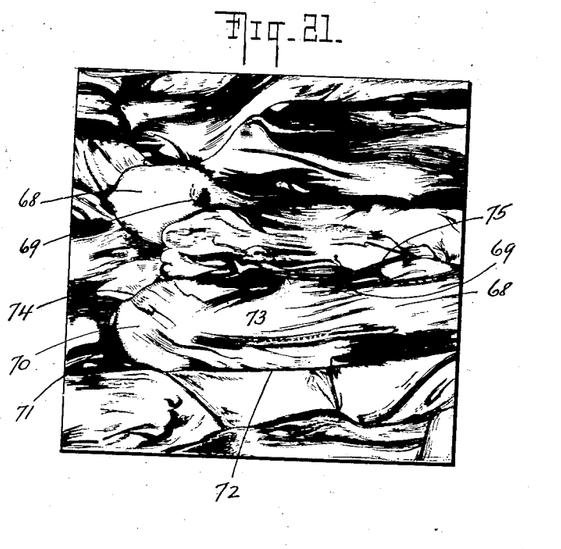
Fig. 21 shows a sheet produced from the body of material of Fig. 20, illustrating the practically continuous lustrous nature of the surface.

The cutting of a pressed block at right angles to and parallel to the axes of the component twisted rods, is illustrated in Figs. 19 to 21. Fig. 19 shows a sheet having a novel spider-like pattern which is produced from extruded rods whose original block of plastic material was provided with "vein" sheets. Such a block is shown at 63 in Fig. 18. The cylindrical block has been cut into six segments and between each pair of adjacent segments there has been inserted a plastic vein sheet of contrasting shade or color. This block is then fed into the extrusion press shown in Fig. 1 except that the eccentrically positioned mandrel is not square and slotted as shown, but is more or less cylindrical. There is thus obtained an extruded rod of reduced diameter which upon being cut, grouped in a press-box, pressed, and sheeted at right angles to the axes of the rods, yields a sheet having a pattern similar to that shown in Fig. 19. The sheet shown in this figure was made from a veined block of plastic similar to that shown in Fig. 18, but having eight vein sheets. By positioning the mandrel eccentrically, the veins are given a somewhat spiral twist as shown at 65. The distortion of the veins is due to the mandrel and the irregularity of the design yields a novel and pleasing effect. It may be mentioned that the plastic material employed for making the sheet of Fig. 19 need not have any bronze powder or similar material suspended therein where the desired result is not so much an increased luster as a diversity of design; streaks or lines of luster may however form part of the design.

Very beautiful color and luster effects can be obtained by making the original block of plastic material of parts of different color. Thus Fig. 20 shows an extruded twisted rod made from a cylinder or cartridge composed of segments of, for example, purplish and greenish tints. The extruded rod shows spiral bands of purple 66 merging into spiral bands of green 67, the surfaces being lustrous and the interior of the rod having numerous planes of luster. Fig. 21 shows a sheet cut from a pressed block of twisted rod similar to that shown in Fig. 20. This sheet has green zones of very high luster, as shown for example, at 68, merging into zones of lower luster 69 in such a manner as to give an impression of colors of different shades, the luster varying as the sheet is held at different inclinations to the light as lustrous areas of different inclinations are made reflecting. In similar fashion, the purplish areas 70 of high luster run into areas 71 of lower luster, the relative luster, however, varying as the inclination of the sheet is varied. The effect is very similar to that of mother of pearl which reveals different areas of luster as it is moved about in the hand. The lines 72 show the areas of separation between adjacent plastic rods of which the block from which the sheet was cut was composed. As will be seen from the portion 73 defined by the bounding lines 72, 74 and 75, the lustrous zones corresponding to each original rod extend for considerable areas, as much as four and more inches depending upon the size to which the extruded rod was cut. The portion 73 in the present instance is not of one color, but, as it was formed from the rod shown in Fig. 20 shows greenish areas blending gradually into purple areas in a very pleasing fashion. It will be readily seen that, by employing rods of different sizes and colors and by arranging them in different ways, various pattern and color effects, combined with a high degree of "pearl" or luster may be obtained. These color shadings and nuances cannot, of course, be shown on the drawings.

It will be understood that where the luster-producing particles are not incorporated in the mixture, the present method may be utilized for the production of what might be termed horns or mottles, as distinguished from the production of materials referred to as pearls. In other words, by extruding a cartridge made up of different colors without the luster particles, the rods or tubes formed therefrom may be compressed into a block and sheeted to produce sheets having a general pattern made up of the various colors, this material being referred to in the art as horns or mottles, as distinguished from those materials in which the luster-producing particles are utilized for the production of what are known as pearls.

An interesting property of the sheet of Fig. 21 and similar sheets produced in accordance with the invention is that the rather small dull areas which are shown in solid black upon the drawings are for the most part dull only when the sheet is held in a certain position. When the angle of the sheet is changed, new planes of luster within such dull areas are brought into reflecting condition and such hitherto dull areas become areas of high or intermediate luster. The sheet may thus be said to have lustrous zones over practically its entire extent.

Where the mandrel is positioned concentrically within the bushing, the extruded plastic material may be permitted to issue from the nozzle in the form of a more or less flat and straight rod. However, if desired, the issuing rod of plastic may be twisted by hand. I prefer, however, to arrange the mandrel eccentrically and thereby obtain a twisted extruded rod automatically.

I am aware that it is known to provide means for centering a mandrel with respect to its bushing in an extrusion machine. So far as I am aware, however, such means have never been employed deliberately to throw the mandrel off center with respect to the bushing; nor to my knowledge has the extrusion of a cellulosic or other ornamental plastic ever been carried out prior to my invention through a nozzle having an eccentrically positioned bushing.

Very curious and interesting effects may be obtained by the eccentric positioning of the mandrel. Where both the bushing and the mandrel are round and eccentric with respect to each other, an extruded tube is obtained which is of non-uniform cross-section, that is, its internal and external peripheries are eccentric with reference to each other. If the end of this tube is pinched to close it and the tube is then caused to pass downwardly over an approximately right-angled bend and then drawn off horizontally, it collapses with a repeated "gasping" action as the internal support of the air is removed and the atmospheric pressure acts thereon, the collapsed tube taking the form of a rod having under-cut ridges of V-form at one side thereof. These ridges are inclined to varying extents to the longitudinal center of the rod; that is, the apices of the V-ridges are positioned alternately upon opposite sides of such center. The apices of the successive ridges are connected between the ridges by webs running to the bottom of the rod. The ridges of the rod are formed of the thicker portions of the extruded tube while the bottom of the rod is made up of the collapsed thinner portions of the tube, the whole rod being formed of collapsed or doubled tube walls.

Twisted extruded rods of different shapes may be obtained by utilizing nozzles wherein the internal bore of the bushing is of different shape from that of the mandrel, the mandrel being solid. Thus, the bore of the bushing may be square, circular, fluted and circular, fluted and square, or have any other polygonal shape, while the mandrel may be round, square, or of any other shape, various combinations of these shapes producing continuous extruded rods of different form and cross-section, particularly when the mandrel is eccentrically positioned. In this way, spirally shaped rods having sharp or rounded spiral ridges, flutings, etc. and combinations of these design elements can be obtained.

When a plastic material is employed which has no bronze powder or other luster-producing material suspended therein, the dividing mechanism need have only one set of circumferential slots 37. In any case, these slots need not necessarily be arcuate; they may be circular or of any other shape, the initially formed zones of luster being of corresponding extension.

One of the important advantages of the present invention over prior methods of producing lustrous sheets is that only about 20%-30% of alcohol need be employed to form the plastic mass. This amount of solvent makes a mass which is consistent enough to form a relatively rigid cylinder in the molding box which can be cut with a "guillotine" or other suitable knife. The loss of solvent is thereby reduced to a minimum. According to older methods, where a "stocking" was extruded, the material had to be quite soft in order to acquire luster, and about 45% of alcohol had to be employed. The loss of solvent was thus quite large while in addition considerable time and labor had to be spent in rolling and drying the original extruded sheet and the sheets later cut from a block composed of a number of pressed superposed "stocking" sheets. By the use of a smaller quantity of solvent in my improved process, the rolling operation for expelling solvent is entirely eliminated.

The ram 14 and fluid pressure cylinder 12 of the press shown in Fig. 1 may be replaced by a screw conveyor, in which case the original mass of plastic is not fed as a cylinder but is cut up into small pieces.

How much greater is the amount of lustrous areas obtainable by the process of the present invention as compared with prior processes will readily be seen from the following example. Assuming that a bushing having a bore in the shape of a six-pointed star is employed in association with a solid, square or round mandrel, there is obtained an extruded tube which is lustrous along all the surfaces between the points of the star. These tubes are collapsed into a flat strip which may be about ¼ of an inch thick and about 1¼ to 1½ inches wide. These strips are cut into any desired lengths, and then placed in a chase, compressed and later cut into sheets. The much greater lustrous area contained in a compressed mass of plastic material made up of these flattened tubes as compared with the old dicing method will be evident when it is considered that when these flattened strips are cut into, say, three-inch lengths, each strip is lustrous on all of its surfaces except the two narrow cut end surfaces whose areas is only about ¼ inch by about 1¼ inches, whereas both faces of the strip, each of which is at least 1¼ by 3 inches are lustrous. To this should be added the longitudinal ends which are likewise lustrous; moreover, the surface on the top and bottom faces is not flat, but undulating, thereby presenting an even greater lustrous area. To these lustrous areas should be added the internal zones or areas of luster which are revealed by the knife. In the case of the dicing heretofore practiced, the dice, which were cubes of about ¼ to ½ inch on a side, presented two lustrous surfaces and four non-lustrous surfaces, the non-lustrous area being thus twice as large as the lustrous area, whereas in accordance with the present invention the lustrous area of the pieces of plastic which are to make up the block from which the final sheets are cut, far exceeds the non-lustrous area and, moreover is continuous for much greater areas than heretofore.

As can be seen from Figs. 20 and 21, which show an extruded rod and a patterned lustrous sheet drawn to full size, the lustrous areas have considerable width, being as much as ½ to ¾ inch wide and even more at numerous places. Were the sheet shown in Fig. 21 produced from rods of the size of that shown in Fig. 20 but having luster only upon its outer surface, it is obvious that the sheet would have only isolated areas of luster, the portions of sheet formed by the internal portions of the adjoining rod sections being devoid of lustrous areas. In the case of a sheet formed in accordance with the present invention from rods or collapsed tubes of plastic having both external and internal zones or bands of luster, such bands become exposed and visible no matter along what portion the rod is cut. As a result, the sheet of Fig. 21 exhibits throughout practically the greater portion of its area, and in certain instances throughout its whole area, adjoining lustrous areas of considerable size, all such areas presenting a luster of variable and substantially uniformly graduated character, like mother-of-pearl, when viewed at different angles.

For the purpose of comparing the methods of the present invention with the processes now in use for the manufacture of fountain pen barrels, knife handles, etc., the latter may be said to generally involve the following steps:

(1) Mixing the pyroxylin and plasticized (or other plastic), the luster-producing material, such as bronze powder, and the solvent;

(2) Filtering;

(3) Forming solid cylinders of such plastic in a "pearl box" or mold;

(4) Extruding the plastic through a die to obtain a hollow cylinder;

(5) Cutting of the cylinder to produce a sheet;

(6) Drying;

(7) Pressing of the sheet in a chase;

(8) Sheeting, that is, cutting the sheet into thinner sheets;

(9) Re-pressing;

(10) Sheeting;

(11) Dicing, that is, cutting the sheet into small cubes;

(12) Pressing the mass of dice to weld it into a solid block which is generally about 5½ inches thick;

(13) Cutting the block into sheets of the desired size.

In the process of the present invention, the following steps only are necessary, i. e.—

(1) Mixing the pyroxylin and plasticizer, the luster-producing particles, such as bronze powder, and solvent;

(2) Filtering;

(3) Forming a cylinder, for example, 10" in diameter and 45" long in a suitable mold;

(4) Cutting the cylinder into as many segments as desired, and replacing one or more segments with a segment of different color. If the final product is to be veined, a sheet of block pyroxylin plastic, or any other suitable color or material, is interposed between any adjacent segments desired. These operations require an additional hour, but are, of course, only performed when the product is to be multi-colored or veined;

(5) Extruding the plastic during which step the mass is subdivided into ribbons, re-united, and again divided into ribbons which are also again re-united;

(6) Cutting the extruded body, which is of rod-like formation, into sections of suitable lengths;

(7) Pressing the sections of plastic after arranging them according to the desired pattern;

(8) Cutting the pressed plastic into sheets of the desired thickness.

As previously pointed out, this method results in the production of a body having lustrous bands or areas not only at its surfaces but also in various planes disposed at angles to each other internally of the plastic body, whereas in known processes, which have been generally described, the dice formed in the dicing step have luster upon only two opposite sides thereof, the four other sides of each die being lusterless upon the compression of the dice into a solid block and in the subsequent sheeting thereof there are obtained sheets of plastic having angular (generally square) patches of relatively high luster surrounded by relatively large areas of no luster.

In addition to the improved appearance of the product, the method of the present invention is so simplified as to greatly reduce the total time of operation. For the treatment of a batch of 400 pounds, that is from the mixing to the final sheeting, the present method requires approximately 21½ hours, when the extrusion machine is equipped with three nozzles, whereas in the prior processes, the time consumed would be about 54 hours. If the present process is practiced with only one extrusion nozzle, a 400-pound batch would require about 27½ hours. In addition, the present method involves less pressing, thereby reducing the amount of power required and also produces less scrap material.

Especially where a screw feeder is employed, particles of black, aged or seasoned plastic of about $\frac{1}{16}$ inch size may be added to the batch of plastic to produce a desirable speckled appearance. These particles should preferably be relatively hard so as not to diffuse into the main mass of plastic and may be of any desired color. These particles, by producing a wavy effect, improve the luster.

I have found that very satisfactory results can be obtained by employing a 000 aluminum bronze, about 510 grams being used for every 360 pounds of cotton, camphor and solvent, the solvent comprising somewhat less than one-fourth the total weight of material.

The plastic material employed in the present invention may be of various kinds, and although Celluloid is preferred, cellulose acetate plastics and other plastic material can also be used.

Variations from the specific procedures and constructions disclosed hereinabove may be resorted to within the scope of the appended claims without departing from the spirit of the invention.

This application is a continuation of application Serial No. 35,698, filed by applicant August 12, 1935, as to all subject matter common to said two applications.

What I claim is:

1. The method of producing multi-colored sheets having a high degree of luster which comprises uniting differently colored masses of plastic material having luster-producing particles therein, dividing the multi-colored mass into a plurality of parts and passing the latter under pressure over particle orientating surfaces, reuniting said parts with the surfaces of said parts disposed at varying angles through the reunited mass, subdividing said reunited mass and passing the parts thereof over particle orientating surfaces, uniting the second formed parts into an elongated rod-like mass, severing said rod into sections, pressing said sections into a solid block, and sheeting said block.

2. The method of producing sheets having a high degree of luster which comprises dividing a mass of plastic material having luster-producing particles therein into a plurality of ribbon-like parts and passing said parts under pressure over particle orientating surfaces to orientate said particles at the surfaces of each of said parts, uniting said parts, extruding the reunited mass through a tubular slot whose inner and outer walls are arranged eccentrically to each other whereby a twisted rod is formed, severing said rod into sections, pressing a mass of said sections into a solid block, and sheeting said block.

CAMILLO ORSINI.

CERTIFICATE OF CORRECTION.

Patent No. 2,149,066.  February 28, 1939.

CAMILLO ORSINI.

It is hereby certified that error appears in the printed specification of the above numbered patent requiring correction as follows: Page 3, second column, line 7, for the word "instruments" read increments; and that the said Letters Patent should be read with this correction therein that the same may conform to the record of the case in the Patent Office.

Signed and sealed this 4th day of April, A. D. 1939.

Henry Van Arsdale (Seal)  Acting Commissioner of Patents.